(12) United States Patent
Cook et al.

(10) Patent No.: US 12,060,896 B2
(45) Date of Patent: Aug. 13, 2024

(54) INTEGRATED HIGH-PRESSURE UNIT

(71) Applicant: FMC Technologies, Inc., Houston, TX (US)

(72) Inventors: James Cook, Houston, TX (US); Corey Massey, Houston, TX (US); Chad Vrla, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 18/302,886

(22) Filed: Apr. 19, 2023

(65) Prior Publication Data

US 2023/0250836 A1 Aug. 10, 2023

Related U.S. Application Data

(63) Continuation of application No. 17/385,253, filed on Jul. 26, 2021, now Pat. No. 11,661,958.

(51) Int. Cl.
| | | |
|---|---|---|
| *F15B 1/02* | (2006.01) | |
| *E21B 43/26* | (2006.01) | |
| *F15B 1/26* | (2006.01) | |
| *F15B 21/14* | (2006.01) | |
| *F16N 13/16* | (2006.01) | |

(52) U.S. Cl.
CPC .......... *F15B 1/024* (2013.01); *E21B 43/2607* (2020.05); *F15B 1/26* (2013.01); *F15B 21/14* (2013.01); *F16N 13/16* (2013.01); *F15B 2211/20515* (2013.01); *F15B 2211/20523* (2013.01); *F15B 2211/20546* (2013.01); *F15B 2211/20576* (2013.01)

(58) Field of Classification Search
CPC .. F15B 1/024; F15B 1/26; F15B 21/14; F15B 2211/20515; F15B 2211/20523; F15B 2211/20546; F15B 2211/20576; F15B 2211/212; F15B 2211/31547; F15B 2211/327; F15B 2211/329; F15B 2211/6303; E21B 43/2607; F16N 13/16; F16N 11/10
See application file for complete search history.

(56) References Cited

U.S. PATENT DOCUMENTS 9,938,866 B2 * 4/2018 Borek ...................... F01M 1/16
2020/0355321 A1 * 11/2020 Zerkus .................. F16K 3/0254

* cited by examiner

*Primary Examiner* — James G Sayre
(74) *Attorney, Agent, or Firm* — Osha Bergman Watanabe & Burton LLP (57) ABSTRACT

A high-pressure unit (HPU) skid includes one or more hydraulic pumps, a grease pump, a hydraulic reservoir, and two or more accumulators all mounted on a portable frame. The HPU skid also includes fluidic connections to connect one or more valves to an output of the grease pump and fluidic connections to connect one or more valves to an output of at least one of the two or more accumulators. The accumulators are configured to close at least one of the one or more valves using a charged pressure. The HPU skid further includes fluidic connections to connect one or more valves to at least one of the one or more hydraulic pumps. The hydraulic pumps are configured to withdraw hydraulic fluid from the hydraulic reservoir for charging the accumulators, operating the grease pump, charging the accumulators and operating the grease pump at a same time, or operating one or more valves.

17 Claims, 5 Drawing Sheets

INTEGRATED HIGH-PRESSURE UNIT

CROSS-REFERENCE TO RELATED APPLICATIONS

The present application is a continuation of U.S. patent application Ser. No. 17/385,253 filed Jul. 26, 2021.

BACKGROUND

In the petroleum field, wells may undergo completion operations such as frac'ing. This operation requires a significant amount of surface equipment such as frac trees, frac pumps, wireline, etc. Frac trees are equipped with a multitude of valves. These valves are often hydraulicly operated valves such that they require hydraulic fluid, hydraulic pumps, hydraulic lines, and accumulators in order to operate. Further, hydraulic and mechanical valves require systematic greasing in order to operate efficiently. These valves are greased using a grease pump that is often powered by an air compressor. The grease pump delivers grease to the valves using a conveyance mechanism such as grease lines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a high-pressure unit (HPU) skid, an integrated high-pressure system, and a method related to pumping hydraulic fluid and grease. The HPU skid includes one or more hydraulic pumps, a grease pump, a hydraulic reservoir, and two or more accumulators all mounted on a portable frame. The HPU skid also includes fluidic connections to connect one or more valves to an output of the grease pump and fluidic connections to connect one or more valves to an output of at least one of the two or more accumulators. The accumulators are configured to close at least one of the one or more valves using a charged pressure. The HPU skid further includes fluidic connections to connect one or more valves to at least one of the one or more hydraulic pumps. The hydraulic pumps are configured to withdraw hydraulic fluid from the hydraulic reservoir for charging the accumulators, operating the grease pump, charging the accumulators and operating the grease pump at a same time, or operating one or more valves.

The integrated high-pressure system includes a hydraulic pump in fluid communication with a hydraulic reservoir to draw hydraulic fluid from the hydraulic reservoir and pump the hydraulic fluid to a hydraulic line. The hydraulic line is hydraulically connected to a bulkhead arrangement configured to supply fluid from the hydraulic pump to one or more valves. The system also includes an accumulator connected to the hydraulic line and an actuator valve, disposed along the hydraulic line, having an ability to open and close wherein opening the actuator valve places the accumulator in fluid communication with the hydraulic pump using the hydraulic line. The system further includes a grease pump connected to the hydraulic line and a grease valve, disposed along the hydraulic line, having an ability to open and close wherein opening the grease valve places the grease pump in fluid communication with the hydraulic pump using the hydraulic line.

The method includes drawing hydraulic fluid, using a hydraulic pump, from a hydraulic reservoir, pumping hydraulic fluid to a hydraulic line using the hydraulic pump, and operating one or more valves by pumping the hydraulic fluid to the one or more valves using the hydraulic pump and the hydraulic line. The method also includes opening an actuator valve, disposed along the hydraulic line, to pump hydraulic fluid from the hydraulic line to an accumulator to charge the accumulator, closing one or more valves using the charged accumulator, and activating a grease valve, disposed along the hydraulic line, to pump hydraulic fluid to a grease pump from the hydraulic line. The method further includes pumping grease to one or more valves using the grease pump.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
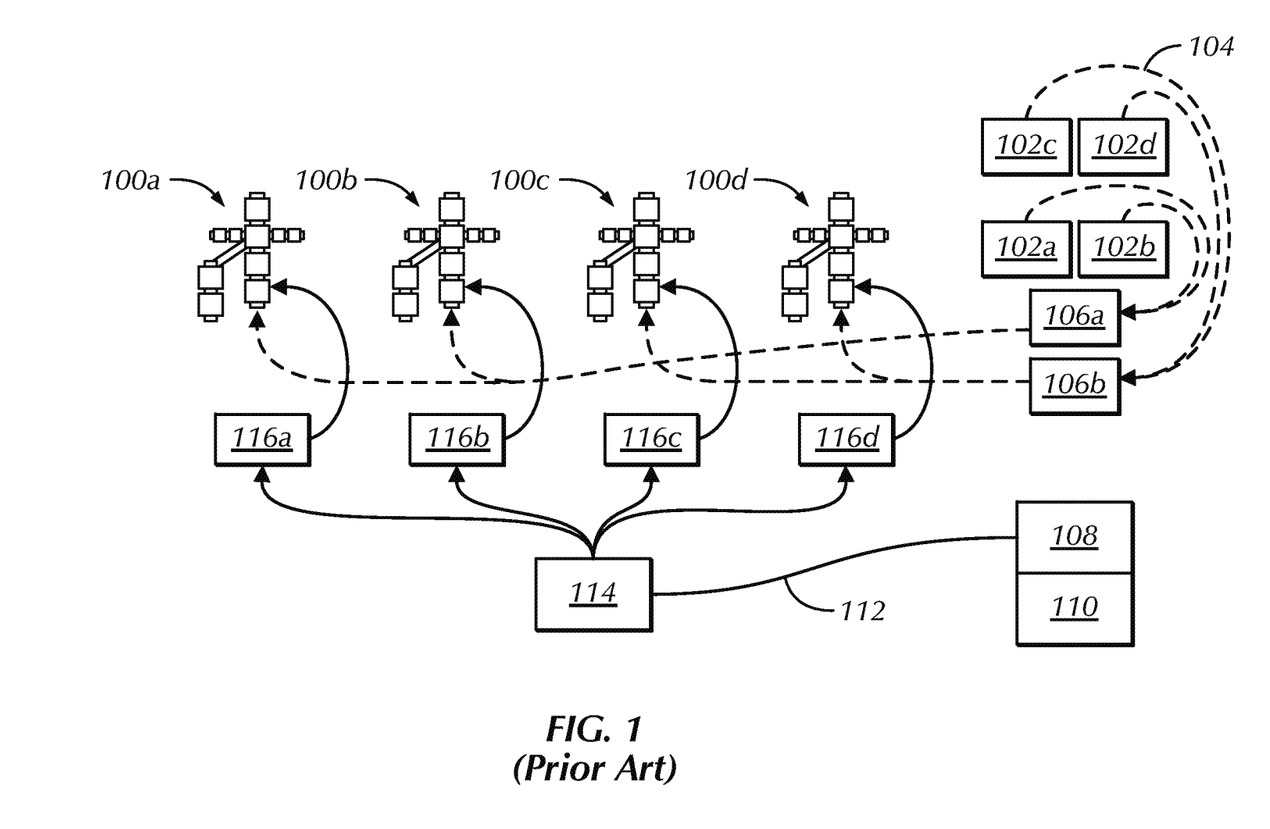
FIG. 1 is prior art and shows a section of a frac pad in accordance with one or more embodiments.

A frac pad is a location where a frac'ing operation may take place. A frac pad is equipped with equipment for performing the frac'ing operation such as wireline equipment, perforating equipment, frac pumps, frac trees, etc. FIG. 1 shows a section of a frac pad containing frac trees (100a-d) and the equipment used to operate and grease valves on the frac trees (100a-d). Specifically, FIG. 1 shows a first frac tree (100a), a second frac tree (100b), a third frac tree (100c), and a fourth frac tree (100d). Each frac tree (100a-d) is associated with a well (not pictured).

A frac tree (100a-d) is a system of spools and valves that allows equipment and frac fluid to enter and interact with the well. Each frac tree (100a-d) has a plurality of valves (not pictured) that are mechanically or hydraulically operated. Certain valves on the frac trees (100a-d) are required to be hydraulically operated such that they may be actuated from a distance. This is because frac operations are high pressure operations and valve operators must remain outside of a set radius from the frac trees (100a-d) and pipe while they are pressurized.

Hydraulic valves are operated using hydraulic high-pressure units (HPUs) (102a-d). Hydraulic HPUs (102a-d) are made of hydraulic storage tanks, accumulators, and at least one hydraulic pump. FIG. 1 shows a separate hydraulic HPU (102a-d) (a first hydraulic HPU (102a), a second hydraulic HPU (102b), a third hydraulic HPU (102c), and a fourth hydraulic HPU (102d)) for each frac tree (100a-d). The hydraulic HPUs (102a-d) pump hydraulic fluid to the frac trees (100a-d) using hydraulic lines (104). Hydraulic lines (104) may be any conveyance device, such as flexible piping or tubing, that are made to withstand the pressure of the hydraulic fluid from within and withstand the external environmental conditions in which they are used.

More specifically, the hydraulic HPUs (102a-d) pump hydraulic fluid initially to hydraulic distribution boxes (106a-b). FIG. 1 shows a first hydraulic distribution box (106a) and a second hydraulic distribution box (106b). The first hydraulic distribution box (106a) and the second hydraulic distribution box (106b) are used to direct the hydraulic fluid to the valve that requires operation. In this embodiment, the hydraulic lines (104) coming from the first hydraulic HPU (102a) and the second hydraulic HPU (102b) are directed towards the first hydraulic distribution box (106a). The hydraulic lines coming from the third hydraulic HPU (102c) and the fourth hydraulic HPU (102d) are directed towards the second hydraulic distribution box (106b).

The first hydraulic distribution box (106a) services the first frac tree (100a) and the second frac tree (100b). The second hydraulic distribution box (106b) services the third frac tree (100c) and the fourth frac tree (100d). In one or more embodiments, a particular valve on the first frac tree (100a) requires operation. In this scenario, the first hydraulic HPU (102a) pumps hydraulic fluid, using hydraulic lines (104), to the first hydraulic distribution box (106a). The first hydraulic distribution box (106a) directs the hydraulic fluid to enter the hydraulic line (104) that specifically services that particular valve on the first frac tree (100a).

FIG. 1 also depicts a grease pump (108) that is powered by an air compressor (110). The grease pump (108) pumps grease, through grease lines (112), to a grease smart box (114). The grease lines (112) are similar to the hydraulic lines in that they may be any conveyance device, such as flexible piping or tubing, that are made to withstand the pressure of the grease from within and withstand the external environmental conditions in which they are used. The grease smart box (114) directs the grease to a first grease distribution box (116a), a second grease distribution box (116b), a third grease distribution box (116c), and a fourth grease distribution box (116d).

The first grease distribution box (116a) has individual grease lines (112) servicing each valve on the first frac tree (100a). The second grease distribution box (116b) has individual grease lines (112) servicing each valve on the second frac tree (100b). The third grease distribution box (116c) has individual grease lines (112) servicing each valve on the third frac tree (100c). The fourth grease distribution box (116d) has individual grease lines (112) servicing each valve on the fourth frac tree (100d).

In one or more embodiments, a particular valve on the third frac tree (100c) requires greasing. In this scenario the air compressor (110) powers the grease pump (108) to pump grease to the grease smart box (114) through the grease lines (112). The grease smart box (114) directs the grease to the grease line (112) servicing the third grease distribution box (116c). The third grease distribution box (116c) directs the grease to the grease line (112) servicing the particular valve on the third frac tree (100c).

As described above, methods and systems for actuating and greasing valves on a frac pad require separate infrastructures to operate the hydraulics for each frac tree (100a-d) and a separate infrastructure to operate the greasing system. The hydraulic pumps on each hydraulic HPU (102a-d) are often idle because there is no need to run them once the accumulator reaches the required volume/pressure. Further, this set up takes up a lot of space on the frac pad. Thus, systems and methods that allow less equipment to be on the frac pad and allow for the equipment to be used efficiently is beneficial. As such, embodiments disclosed herein present systems and methods that allow for combination of the infrastructures for the hydraulics system and the greasing system into one integrated HPU skid. These systems may allow for significantly less hydraulic lines (104) and grease lines (112) on location which allows making the lines easier to bulkhead to provide cleaner work areas.

Figure 2:
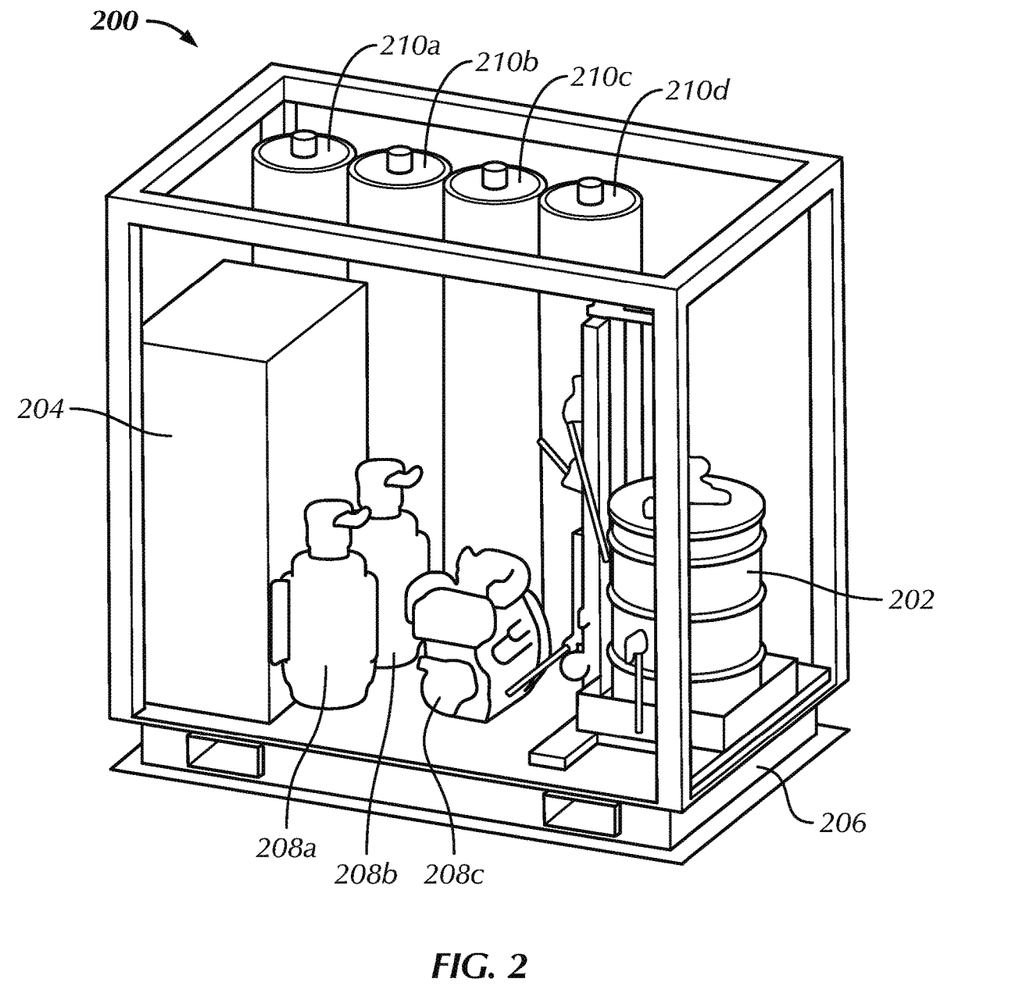
FIG. 2 shows a high-pressure unit skid in accordance with one or more embodiments.

FIG. 2 depicts a high-pressure unit (HPU) skid (200) for greasing and/or actuating at least one frac tree valve in accordance with one or more embodiments. The HPU skid (200) includes one or more electric-driven pumps, one or more diesel-driven pumps, a grease pump (202), a hydraulic reservoir (204), and two or more accumulators all of which are mounted to a portable frame (206). More specifically, FIG. 2 shows two electric-driven pumps (the first hydraulic pump (208a) and the second hydraulic pump (208b)), one diesel-driven pump (the third hydraulic pump (208c)), and four accumulators (the first accumulator (210a), the second accumulator (210b), the third accumulator (210c), and the fourth accumulator (210d)).

The frac tree valves may be hydraulic valves and mechanical valves located on a frac tree. The frac tree may be similar to the first frac tree (100a), second frac tree (100b), third frac tree (100c), or fourth frac tree (100d) as described in FIG. 1. The mechanical valve may be greased by the HPU skid (200), and the hydraulic valves may be greased and actuated by the HPU skid (200). The portable frame (206) may be a 40 ft×20 ft truck mountable box or similar truck mountable box. The portable frame (206) may be made of steel such that the portable frame (206) may hold the weight of the previously listed equipment. The previously listed equipment may be fixed to the portable frame (206) by being welded or tied down. The portable frame (206) may be moved using a crane or a forklift.

The hydraulic reservoir (204) is a container with the ability to hold hydraulic fluid. The hydraulic reservoir (204)

may be made out of any material that is able to withstand the effects of hydraulic fluid storage such as steel. The hydraulic reservoir (204) may be a cylindrical tank or a rectangular prism as shown in FIG. 2. The first hydraulic pump (208a) and the second hydraulic pump (208b) are powered by electricity. This means the first hydraulic pump (208a) and the second hydraulic pump (208b) are driven by electric motors connected to an electrical power source. Thus, there exists an electrical connection to connect the electric-driven pumps (208a-b) to a power supply. The power supply may be external to the HPU skid (200). The third hydraulic pump (208c) is powered by diesel. This means the third hydraulic pump (208c) is driven by a diesel motor that is able to be refilled with diesel fuel. The hydraulic pumps (208a-c) may be variable displacement pumps or traditional open-loop pumps.

The first hydraulic pump (208a), the second hydraulic pump (208b), and the third hydraulic pump (208c) may be in fluid connection with the hydraulic reservoir (204) such that the first hydraulic pump (208a), the second hydraulic pump (208b), and the third hydraulic pump (208c) may draw hydraulic fluid from the hydraulic reservoir (204). In other embodiments, a boost pump (not pictured) may be in fluid communication with the hydraulic reservoir in order to draw hydraulic fluid from the hydraulic reservoir and pump the hydraulic fluid to the first hydraulic pump (208a), the second hydraulic pump (208b), and the third hydraulic pump (208c). The boost pump may be mounted to the portable frame (206). The boost pump may be electric or diesel driven.

The first hydraulic pump (208a), the second hydraulic pump (208b), and the third hydraulic pump (208c) may have three corresponding valves that may open and close. The valves may actuate in sync or separate from one another. Each hydraulic pump (208a-c) may be placed in fluid communication with the accumulators (210a-d) and the grease pump by opening the hydraulic pump's (208a-c) corresponding valve. The accumulators (210a-d) have an actuator valve that may also open and close. When the actuator valve is opened, the accumulators (210a-d) are placed in fluid communication with at least one of the hydraulic pumps (208a-c) such that the hydraulic pumps (208a-c) may charge the accumulators (210a-d) by pumping hydraulic fluid into the accumulators (210a-d). A fluidic connection exists to connect each accumulator to the frac tree valves. This fluidic connection may be performed by hydraulic lines (104).

Figure 3:
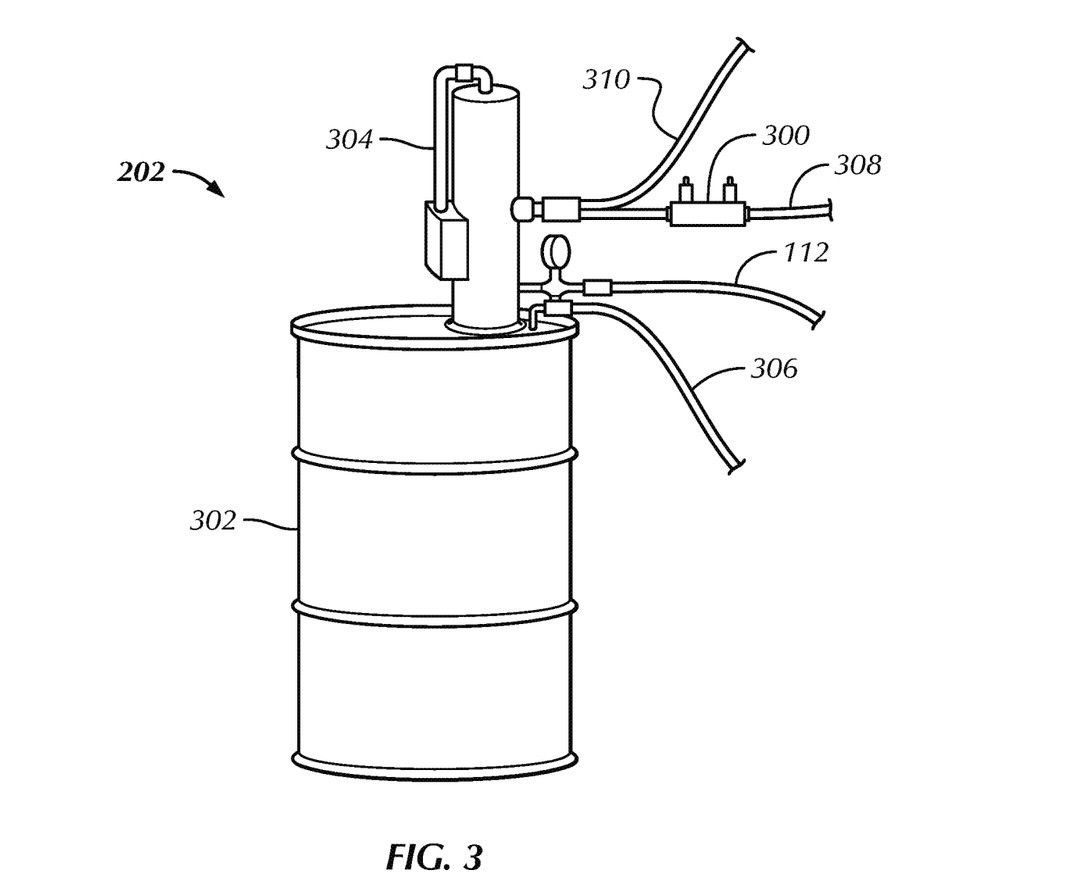
FIG. 3 shows a grease pump in accordance with one or more embodiments.

The grease pump (202) may have a grease valve (300) that is responsive to hydraulic pressures in the hydraulic cylinder (304) to initiate actuation. When the grease valve (300) is actuated, the grease pump (202) is placed in fluid communication with at least one of the hydraulic pumps (208a-c) such that the hydraulic pumps (208a-c) may operate the grease pump (202). A fluidic connection exists to connect an output of the grease pump (202) to the frac tree valves. This fluidic connection may be performed by grease lines (112). The grease pump (202) is shown in detail by FIG. 3. FIG. 3 shows the major working components of the hydraulic-powered grease pump (202).

The grease pump (202) is powered by hydraulic fluids and includes a grease reservoir (302), hydraulic cylinder (304), hydraulic lines (104), the grease valve (300), grease lines (112), and a relief line (306). The grease reservoir (302) stores grease and may be a cylindrical tank as shown in FIG. 3. The grease reservoir (302) may be made of any material that can handle grease and environmental conditions. The hydraulic cylinder (304) is fluidly connected to the grease reservoir (302).

The hydraulic cylinder (304) may be installed on top of the grease reservoir (302). The hydraulic cylinder (304) is connected to hydraulic lines (104). The hydraulic lines (104) may be a hydraulic supply line (308) and a hydraulic return line (310). The hydraulic supply line (308) transports the hydraulic fluid being pumped from the hydraulic pumps (208a-c) to a receptacle such as the hydraulic cylinder (304). The hydraulic return line (310) transports the hydraulic fluids from a source, such as the hydraulic cylinder (304), to the hydraulic reservoir (204).

A grease line (112) is connected to the output of the hydraulic cylinder (304) to transport grease towards the frac tree valves. A relief line (306) may also be installed on the hydraulic cylinder (304) to act as a pressure relief in the system. The relief line (306) may be made out of a similar material to the grease lines (112) and the hydraulic lines (104). A grease valve (300) is installed on the hydraulic supply line (308). The grease valve (300) places the grease pump (202) in fluid communication with at least one of the hydraulic pumps (208a-c).

The grease valve (300) may be a reciprocating solenoid/control valve. The grease valve (300) receives a flow rate of hydraulic fluid, and the grease valve (300) will automatically cycle the hydraulic cylinder (304) back and forth. The more flowrate the hydraulic pumps (208a-c) feed the grease valve (300), the faster the hydraulic cylinder (304) will cycle. The cycling of the hydraulic cylinder (304) withdraws grease from the grease reservoir (302) and pumps the grease out of the grease pump (202) using the grease line (112).

Figure 4:
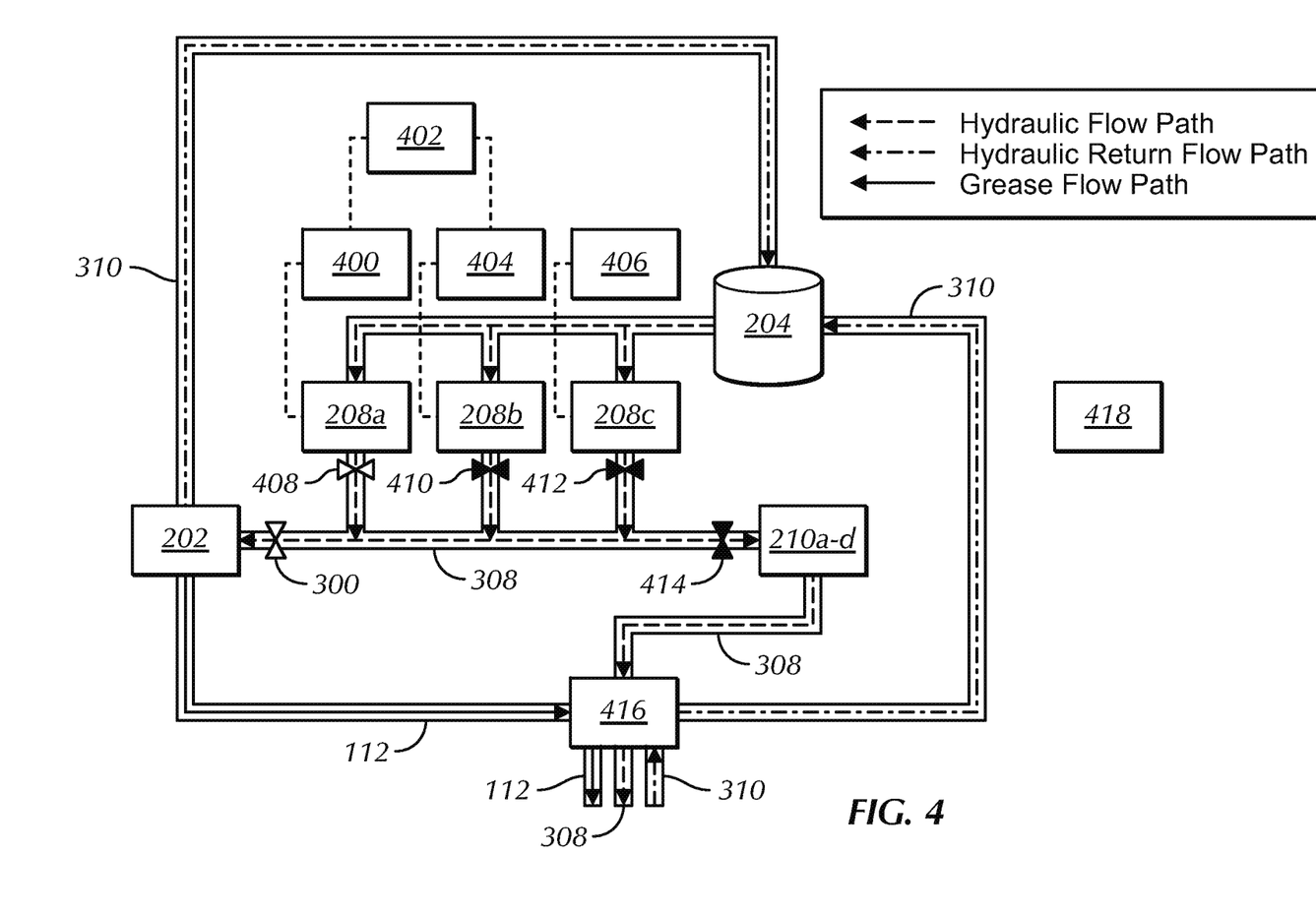
FIG. 4 shows an integrated high-pressure system in accordance with one or more embodiments.

FIG. 4 shows an integrated high-pressure system. More specifically, FIG. 4 shows how the various pieces of equipment of the HPU skid (200) interact with one another. Components of FIG. 4 that are the same or similar to components depicted in FIGS. 1-3 have not been redescribed for purposes of readability and have the same purposes and functions as described previously.

The system as depicted in FIG. 4 shows a first hydraulic pump (208a) coupled to a first electric motor (400) connected to a power source (402), a second hydraulic pump (208b) coupled to a second electric motor (404) connected to the power source (402), and a third hydraulic pump (208c) coupled to a diesel motor (406). Each hydraulic pump (208a-c) has a corresponding valve: the first hydraulic pump (208a) has a first valve (408), the second hydraulic pump (208b) has a second valve (410), and the third hydraulic pump (208c) has a third valve (412).

The valves (408, 410, 412) may be any type of valve know in the art and they may be mechanically or electronically controlled. Each hydraulic pump (208a-c) is connected to the hydraulic supply line (308), and the valves (408, 410, 412) place the hydraulic pumps (208a-c) in fluid communication with the hydraulic supply line (308). The hydraulic pumps (208a-c) may be in fluid communication with the hydraulic reservoir (204) to draw fluid from the hydraulic reservoir (204). In other embodiments, the hydraulic pumps (208a-c) may be connected to boost pumps that may help prime and operate the hydraulic pumps (208a-c) using hydraulic fluid from the hydraulic reservoir (204).

A grease valve (300) and an actuator valve (414) are shown disposed along the hydraulic supply line (308). The grease valve (300) and the actuator valve (414) have an ability to open and close. The valves (408, 410, 412) may be any type of valve know in the art and they may be mechanically or electronically controlled. Each hydraulic pump (208a-c) is shown in fluid communication with the hydraulic reservoir (204). Each hydraulic pump (208a-c) is also shown with at least one hydraulic supply line (308) exiting the hydraulic pump (208a-c) and being directed towards a main hydraulic supply line (308) which supplies both the grease pump (202) and the accumulators (210a-d). This allows the hydraulic pumps (208a-c) to charge the accumulators (210a-d) and operate the grease pump (202). This may be done by any combination of hydraulic pumps (208a-c).

The grease pump (202) shows a grease line (112) exiting the grease pump and entering a bulkhead arrangement (416). The bulkhead arrangement (416) is a combination of all the grease lines (112) and hydraulic lines (104) that need to exit the HPU skid (200) and go out towards the frac tree valves. The grease pump (202) also shows a hydraulic return line (310) exiting the grease pump (202) and entering the hydraulic reservoir (204). The accumulators (210a-d) show a hydraulic supply line (308) exiting the accumulators (210a-d) and entering the bulkhead arrangement (416).

The bulkhead arrangement shows a grease line (112) and a hydraulic supply line (308) exiting the HPU system. These lines may be going to various frac trees and frac valves on a frac pad as explained in FIG. 1. A hydraulic return line (310) is also shown entering the bulkhead arrangement (416) and exiting the bulkhead arrangement (416). The hydraulic return line (310) is shown entering the hydraulic reservoir (204). This shows hydraulic fluid coming from outside the HPU system (such as from a frac tree valve) to be returned to the hydraulic reservoir (204).

In further embodiments, the integrated high-pressure system shown in FIG. 4 may include a plurality of sensors (not pictured). The sensors may be any type of sensor known in the art such as a pressure sensor, flow rate sensor, or temperature sensor. These sensors feed information to a control box (418). The control box (418) may have a computer processor with an imbedded program to analyze the information and/or perform automated responses to various provided information.

These sensors may be located anywhere within the system such as along the hydraulic supply lines (308), hydraulic return lines (310), and the grease lines (112). The sensors may also be located on the first valve (408), the second valve (410), the third valve (412), the grease valve (300), and the actuator valve (414). Further, the sensors may be located within the various pumps (202, 208a-c) and accumulators (210a-d) or along an inlet and/or outlet of the various pumps (202, 208a-c) and accumulators (210a-d).

The control box (418) may use the information gathered from the sensors to monitor and/or control each of the valves (300, 414, 408, 410, 412), pumps (202, 208a-c), motors (400, 404), and accumulators (210a-d). Connection to the control box (418) may be wired or wireless (as shown in FIG. 4), and the interface to the control box (418) may be a tablet. The control box (418) with the computer processor may allow a user to set grease delivery parameters, such as pressure and rate, and automatically control the operation of the hydraulic pumps (208a-c) to provide said delivery parameters. This may be done while monitoring the actual pressure and flow rate to ensure that said delivery parameters are being met.

Likewise, the user may set lower and upper accumulator (210a-d) pressure limits. The control box (418) may automatically trigger one or more hydraulic pumps (208a-c) to charge the accumulators (210a-d) when the accumulator (210a-d) pressures are low. The control box (418) may also automatically isolate the hydraulic pump(s) (208a-c) from the accumulators (210a-d) and/or turn off the hydraulic pump(s) (208a-c) when a max pressure is met.

Additionally, the control box (418) may use the information provided by the sensors to identify when one or more of the hydraulic pumps (208a-c) has a failure and automatically trigger a different hydraulic pump (208a-c) to turn on. For instance, the control box (418) may identify a faulty hydraulic pump (208a-c) if the pressure output falls outside of a predetermined range, or if the hydraulic pump (208a-c) fails to turn on entirely. In that case, the control box (418) may turn off the faulty hydraulic pump (208a-c) and turn on one of the backup pumps (208a-c). When both electric pumps (208a-b) and diesel pumps (208c) are available, the control box (418) may engage the diesel pump (208c) when electric power to the other pumps (208a-b) fails.

In one or more embodiments, the first valve (408) is open, the second valve (410) is closed, and the third valve (412) is closed. Further, the grease valve (300) on the grease pump (202) is open and the actuator valve (414) on the accumulators (210a-d) is closed. This places the first hydraulic pump (208a) in a fluid connection with the grease pump (202) through the hydraulic supply line (308). When the first hydraulic pump (208a) is turned on and pumping, hydraulic fluid may be withdrawn from the hydraulic reservoir (204) and pumped from the first hydraulic pump (208a) through the hydraulic supply line (308) and into the grease pump (202). The grease pump (202) may then pump grease out of the grease pump (202) through the grease line (112) towards the bulkhead arrangement (416) to be transported out of the HPU system.

While the diagram in FIG. 4 shows only one line for each hydraulic return line (310), hydraulic supply line (308), and grease line (112), there may be more than one line without departing from the scope of the disclosure herein. Furthermore, any combination of opening and closing the first valve (408), second valve (410), third valve (412), grease valve (300), and actuator valve (414) may be done without departing the scope of the disclosure. One hydraulic pump (208a-c) may be used to operate the entire system with the other number of hydraulic pumps used as a backup, and the system may include any number of hydraulic pumps that are electric or diesel driven. In other embodiments, the hydraulic pumps (208a-c) may operate the grease pump (202) and charge the accumulators (210a-d) at the same time or at separate times.

The ability to grease frac valves and provide hydraulic actuation to the frac valves on a frac pad using one integrated HPU skid (200) allows for more efficient use of one hydraulic pump (such as hydraulic pumps 208a-c) rather than idling multiple pumps for multiple pressurization skids and an air compressor is no longer needed to run one or multiple grease pumps (108). Further, the number of grease lines (112) and hydraulic lines (104) may be decreased. All of these benefits allow for less space to be taken up on a frac pad which creates a cleaner and safer working environment.

Figure 5:
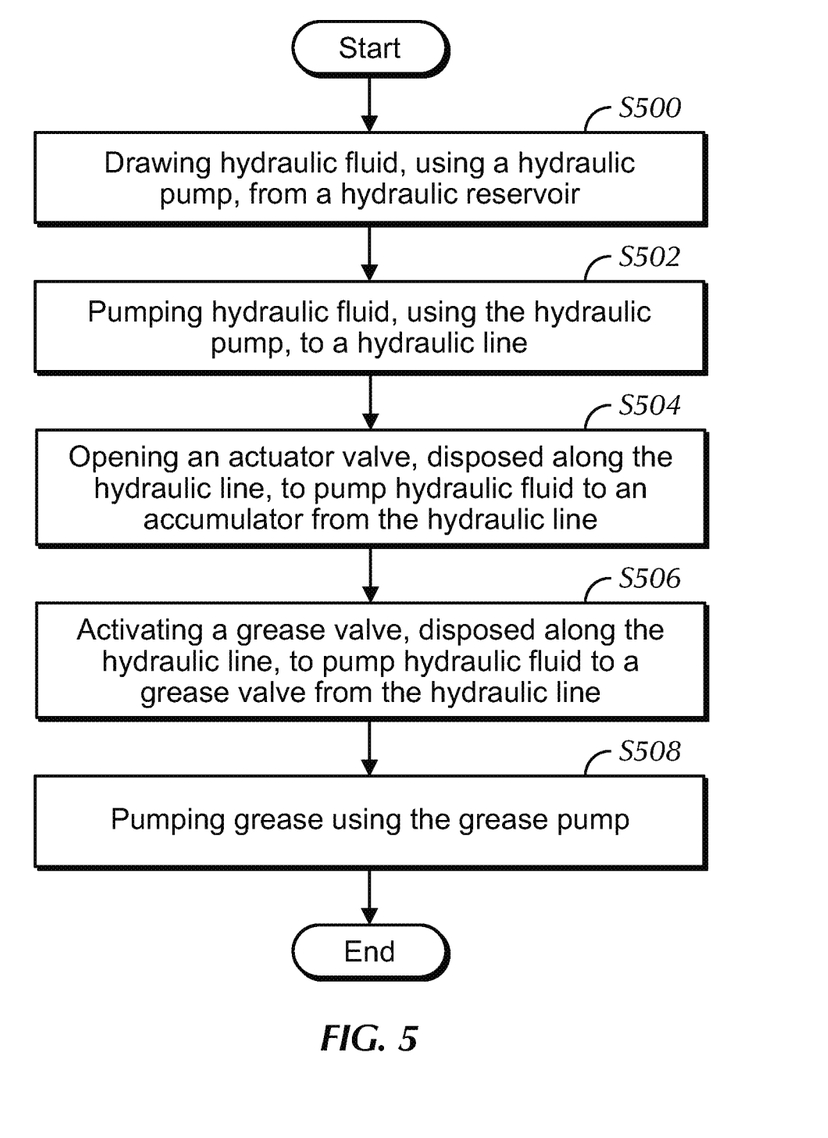
FIG. 5 shows a flowchart in accordance with one or more embodiments.

FIG. 5 shows a flowchart in accordance with one or more embodiments. Specifically, FIG. 5 shows a method for operating a greasing and hydraulic operation using an HPU skid (200). Further, one or more blocks in FIG. 5 may be performed by one or more components as described in FIGS. 1-4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, hydraulic fluid is drawn, using a hydraulic pump (208a-c), from a hydraulic reservoir (204) (S500). The hydraulic pump (208a-c) may be an electric-driven pump such as the first hydraulic pump (208a) and the second hydraulic pump (208b). The hydraulic pump (208a-c) may be a diesel driven pump such as the third hydraulic pump. Furthermore, a combination of hydraulic pumps (208a-c) may be used. In one or more embodiments, the hydraulic pump includes two electric-driven hydraulic pumps (such as the first hydraulic pump (208a) and the second hydraulic pump (208b)) each coupled to a corresponding electric motor (400, 404) and a power source (402) and one diesel-powered pump (such as the third hydraulic pump (208c)) coupled to a diesel motor (406).

The hydraulic fluid is pumped, using the hydraulic pump(s) (208a-c), to a hydraulic line (104) (S502). There may be corresponding valves (408, 410, 412) each coupled to a hydraulic pump (208a-c). For example, if three hydraulic pumps (208a-c) are used, then there may be three corresponding valves such as the first valve (408), the second valve (410), and the third valve (412). The valves (408, 410, 412) may be opened or closed to place the corresponding hydraulic pump (208a-c) in fluid communication with the hydraulic line (104). One or more of the available hydraulic pumps (208a-c) may be used to pump hydraulic fluid to the hydraulic line (104). This is controlled by the actuation of the valves (408, 410, 412) and operation of the corresponding hydraulic pump (208a-c). Furthermore, the valve (408, 410, 412) operation and the hydraulic pump (208a-c) operation may be automatic. For example, if the first hydraulic pump (208a) fails, the first valve (408) closes, the second valve (410) opens, and the second hydraulic pump (208b) begins operating.

An actuator valve (414), disposed along the hydraulic line (104), is opened to pump hydraulic fluid to an accumulator (210a-d) from the hydraulic line (104) (S504). The hydraulic fluid is used to charge the accumulator (210a-d) such that the accumulator (210a-d) is always under pressure. The accumulator (210a-d) is used to deliver hydraulic fluid to the frac tree valves (408, 410, 412) in order to actuate the frac tree valves (408, 410, 412). There may be four accumulators (210a-d) each having a fluidic connection to the frac tree valves (408, 410, 412). This fluidic connection may be made by one or more hydraulic lines (104). The hydraulic lines (104) may bring the hydraulic fluid directly to the frac tree valves (408, 410, 412) or the hydraulic lines (104) may be connected to a type of hydraulic distribution box (106a-d) to intelligently deliver the hydraulic fluid, using hydraulic lines (104), to the correct frac tree valve.

A grease valve (300), disposed along the hydraulic line (104), is activated to pump hydraulic fluid to a grease pump (202) from the hydraulic line (104) (S506). The grease valve (300) may be a reciprocating solenoid/control valve. The grease valve (300) is activated by responding to hydraulic pressures in the hydraulic cylinder (304). The grease valve (300) receives the hydraulic fluid, from the hydraulic line (104), which causes the hydraulic cylinder (304) of the grease pump to cycle. Each cycle causes the grease pump (202) to pump grease (S508) by withdrawing grease from a grease reservoir (302) and pumping the grease into a grease line (112) using the stroke of the hydraulic cylinder (304) and the hydraulic fluid. The more flowrate the hydraulic pumps (208a-c) feed the grease valve (300), the faster the hydraulic cylinder (304) will cycle.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:
1. A high-pressure unit skid comprising:
   mounted on a portable frame:
      one or more hydraulic pumps;
      a grease pump;
      a hydraulic reservoir;
      at least one boost pump configured to draw hydraulic fluid from the hydraulic reservoir and pump the hydraulic fluid to the hydraulic pumps; and
      two or more accumulators;
   fluidic connections to connect one or more valves to an output of the grease pump;
   fluidic connections to connect one or more valves to an output of at least one of the two or more accumulators, wherein the accumulators are configured to close at least one of the one or more valves using a charged pressure; and
   fluidic connections to connect one or more valves to at least one of the one or more hydraulic pumps;
   wherein the hydraulic pumps are configured to withdraw hydraulic fluid from the hydraulic reservoir for charging the accumulators, operating the grease pump, charging the accumulators and operating the grease pump at a same time, or operating one or more valves.
2. The high-pressure unit skid of claim 1,
   wherein the one or more hydraulic pumps comprise variable displacement pumps.
3. The high-pressure unit skid of claim 2, further comprising:
   an actuator valve configured to place the accumulators in fluid communication with at least one of the hydraulic pumps.
4. The high-pressure unit skid of claim 3, further comprising:
   a grease valve configured to place the grease pump in fluid communication with at least one of the hydraulic pumps.
5. The high-pressure unit skid of claim 4,
   wherein the one or more hydraulic pumps comprise two electric-driven hydraulic pumps and one diesel-driven hydraulic pump having three corresponding valves configured to place any combination of the two electric-driven pumps and one diesel-driven pump in fluid communication with the accumulators and/or the grease pump.
6. An integrated high-pressure system comprising:
   at least two hydraulic pumps in fluid communication with a hydraulic reservoir to draw hydraulic fluid from the hydraulic reservoir and pump the hydraulic fluid to a hydraulic line, wherein the hydraulic line is hydrauli- cally connected to a bulkhead arrangement configured to supply fluid from the hydraulic pump to one or more valves;

at least two electric motors each coupled to one of the at least two hydraulic pumps;

a power source coupled to the at least two electric motors;

an accumulator connected to the hydraulic line;

an actuator valve, disposed along the hydraulic line, having an ability to open and close wherein opening the actuator valve places the accumulator in fluid communication with the hydraulic pump using the hydraulic line;

a grease pump connected to the hydraulic line; and a grease valve, disposed along the hydraulic line, having an ability to open and close wherein opening the grease valve places the grease pump in fluid communication with the hydraulic pump using the hydraulic line.

7. The integrated high-pressure system of claim 6, wherein the hydraulic pump comprises a diesel-powered pump coupled to a diesel motor.

8. The integrated high-pressure system of claim 7, further comprising:

at least three valves having the ability to open and close wherein opening each valve places a corresponding hydraulic pump in fluid communication with the hydraulic line.

9. The integrated high-pressure system of claim 6, wherein the hydraulic line comprises a hydraulic supply line and a hydraulic return line.

10. The integrated high-pressure system of claim 6, wherein the grease pump further comprises a hydraulic cylinder.

11. The integrated high-pressure system of claim 10, wherein the grease valve is responsive to hydraulic pressures in the hydraulic cylinder to initiate actuation of the grease valve.

12. A method comprising:

drawing hydraulic fluid, using at least two hydraulic pumps, from a hydraulic reservoir, wherein the at least two hydraulic pumps are coupled to a corresponding electric motor and a power source;

pumping hydraulic fluid to a hydraulic line using the hydraulic pump;

operating one or more valves by pumping the hydraulic fluid to the one or more valves using the hydraulic pump and the hydraulic line;

opening an actuator valve, disposed along the hydraulic line, to pump hydraulic fluid from the hydraulic line to an accumulator to charge the accumulator;

closing one or more valves using the charged accumulator;

activating a grease valve, disposed along the hydraulic line, to pump hydraulic fluid to a grease pump from the hydraulic line; and pumping grease to one or more valves using the grease pump.

13. The method of claim 12, wherein the hydraulic pump comprises a diesel-powered pump coupled to a diesel motor.

14. The method of claim 13, further comprising:

at least three valves having an ability to open and close wherein opening each valve places a corresponding hydraulic pump in fluid communication with the hydraulic line.

15. The method of claim 12, wherein the hydraulic line comprises a hydraulic supply line and a hydraulic return line.

16. The method of claim 12, wherein the grease pump further comprises a hydraulic cylinder.

17. The method of claim 16, wherein activating the grease valve further comprises:

responding to hydraulic pressures in the hydraulic cylinder using the grease valve.

* * * * *